United States Patent [19]
Milling

[11] Patent Number: 6,021,474
[45] Date of Patent: Feb. 1, 2000

[54] APPARATUS AND METHOD OF SNOOPING PROCESSORS AND LOOK-ASIDE CACHES

[75] Inventor: Philip Erna Milling, Austin, Tex.

[73] Assignee: International Business Machines Corporation, Armonk, N.Y.

[21] Appl. No.: 09/076,798

[22] Filed: May 13, 1998

Related U.S. Application Data

[62] Division of application No. 08/703,323, Aug. 26, 1996.

[51] Int. Cl.$^7$ .............................. G06F 11/30; G06F 12/12
[52] U.S. Cl. .......................... 711/146; 711/141; 711/143; 711/145
[58] Field of Search .................................... 711/141, 143, 711/145, 146, 210

[56] References Cited

U.S. PATENT DOCUMENTS

| | | |
|---|---|---|
| 4,959,777 | 9/1990 | Holman, Jr. . |
| 5,091,846 | 2/1992 | Sachs et al. . |
| 5,155,828 | 10/1992 | La Fetra et al. . |
| 5,155,832 | 10/1992 | Hunt . |
| 5,163,140 | 11/1992 | Stiles et al. . |
| 5,249,782 | 10/1993 | Ide et al. . |
| 5,319,766 | 6/1994 | Thaller et al. . |
| 5,327,547 | 7/1994 | Stiles et al. . |
| 5,335,335 | 8/1994 | Jackson et al. ........................... 711/121 |
| 5,341,487 | 8/1994 | Derwin et al. ........................... 711/146 |
| 5,345,576 | 9/1994 | Lee et al. . |
| 5,355,467 | 10/1994 | MacWilliams et al. . |
| 5,359,723 | 10/1994 | Mathews et al. . |
| 5,398,325 | 3/1995 | Chang et al. . |
| 5,404,473 | 4/1995 | Papworth et al. . |
| 5,440,707 | 8/1995 | Hayes et al. . |
| 5,479,630 | 12/1995 | Killian . |
| 5,506,971 | 4/1996 | Gullette et al. ........................ 710/116 |
| 5,553,265 | 9/1996 | Abato et al. . |
| 5,561,779 | 10/1996 | Jackson et al. . |
| 5,671,391 | 9/1997 | Knotts .................................... 711/143 |
| 5,717,898 | 2/1998 | Kagan et al. ........................... 711/145 |
| 5,761,725 | 6/1998 | Zeller et al. ............................ 711/146 |
| 5,802,577 | 9/1998 | Bhat et al. .............................. 711/146 |
| 5,813,035 | 9/1998 | McCoy et al. .......................... 711/146 |
| 5,875,469 | 2/1999 | Milling .................................. 711/146 |

*Primary Examiner*—B. James Peikari
*Attorney, Agent, or Firm*—Volel Emile

[57] ABSTRACT

The present invention provides a method and apparatus for providing memory coherency among an L1 and an L2 cache memory devices and a main memory device. In an embodiment of the invention, a memory controller generates an address snoop for locating modified copies of a data residing in the main memory. As a result of the snoop, the memory controller is notified as to whether a modified copy of the data is in the cache memory devices. If both cache memory devices have a modified copy of the data, the modified copy in the L2 cache will not be allowed to be transferred since modified copies of data in the L1 cache memory are considered to always be the most recent copies of the data. Thus, if the L1 cache memory is unable to transfer the data, The memory controller will continue to snoop the address until the L1 cache memory transfers the data. If, however, there is only one copy of the modified data and it resides in the L2 cache memory device, the copy will be allowed to be transferred to the memory controller.

4 Claims, 3 Drawing Sheets

APPARATUS AND METHOD OF SNOOPING PROCESSORS AND LOOK-ASIDE CACHES

This is a division of Ser. No. 08/703,323 filed Aug. 26, 1996.

BACKGROUND OF THE INVENTION

1. Field of the Invention

The present invention relates generally to computer systems and, more particularly, to computer systems with L2 cache memory devices having memory controllers devoid of built-in L2 cache controller logic.

2. Description of the Related Art

Most modern computer systems include a processor and a main memory. Typically, the processor operates at a substantially faster speed than the main memory. Thus, the speed at which the processor decodes and executes instructions depends upon the rate at which the instructions can be transferred from the main memory to the processor. To reduce the time required for the processor to obtain instructions from the memory, many computer systems include a cache memory between the processor and the main memory.

A cache memory comprises a relatively small, yet relatively fast memory device arranged in close physical proximity to a processor. The cache memory is used to temporarily hold portions of the contents of the main memory which will be used in the near future by the processor. If these portions are not used within a predetermined amount of time, they are discarded. Before discarding the data, however, the system ascertains that the data is not the only latest copy of the data in main memory. If it is, the data is first copied into the main memory before it is discarded.

The cache memory usually stores many blocks of one or more words of data. To facilitate the retrieval of data, each block of data has associated with it an address tag that uniquely identifies the block in main memory of which it is a copy. As a result of the cache memory's close proximity to the processor as well as its speed, information in the cache memory is accessed faster than information in main memory. Hence, the processor spends far less time waiting for instructions stored in cache memory than in main memory.

In addition to using the cache memory to retrieve data from the main memory, the processor may also write data into the cache memory instead of directly to the main memory. When the processor desires to write data to the memory, the cache memory makes an address tag comparison to see if the data block into which data is to be written resides in the cache memory. If the data block exists in the cache memory, the data is written into the data block in the cache memory. If the data does not exist in the cache memory, the data may either be fetched into the cache memory and be updated or the data may be written directly into the main memory. Data written into the cache memory becomes the latest copy of the data and is usually referred to as a modified cache line.

In some applications, a second look aside cache memory (or L2 cache) may be added to the system. Ordinarily, the first cache (or L1 cache) is incorporated into the processor and the L2 cache is connected to the system bus between the processor and the main memory. As mentioned before, the L2 cache memory has a subset of the data in main memory. Similarly, the L1 cache memory has a subset of the data in the main memory. Further as described above, data may be written into the L1 cache if the data block incorporating the data resides in the L1 cache or into the L2 cache if the data block is stored therein. It is possible, therefore, for the L1 cache memory and the L2 cache memory to both contain modified copies, albeit different, of the same data.

Thus, it is necessary that the latest copy of the data be used by the system to ensure memory coherency. One known method of providing the necessary memory coherency is to implement a snooping bus protocol whereby a bus interface or other component in the system monitors the system bus for bus activity involving addresses of data items that are currently stored in the cache memory devices. For example, a memory controller with a built-in cache controller logic may look at a tag match signal and a modified line signal to ascertain the locality of the latest copy of a data.

Computer systems which support stand alone integrated L2 cache memory devices often do not have memory controllers with a built-in cache controller logic. The memory controllers of these systems have to query or snoop memory addresses referencing particular data to ascertain the location of the data's latest copy. In the prior art, when both the L1 and the L2 cache memory devices had a modified cache line which was being snooped and the processor was too busy to check the L1 cache memory device to see whether the line being snooped was a modified cache line, both copies of the data were transferred to the memory controller. The copy in the L2 cache was transferred in response to the original snoop and the copy in the L1 cache in response to a second snoop. As modified copies of data in the L1 cache are considered the most recent copies of the data, the transmitted copies from the L1 cache were always used and the transmitted data from the L2 cache discarded. If only the L2 cache contains a modified copy of the data, then a second snoop was still initiated to ascertain that the L1 cache did not have a modified cache line. Transmitting modified copies of data in both the L1 cache and the L2 cache when both devices contain a modified line as well as snooping the address twice when only the L2 cache has a modified cache line contribute to a decrease in the performance of the computer system.

Thus, there is a need in the art for a memory controller devoid of a built-in L2 controller logic to snoop a data address only once when a modified copy of the data resides only in an L2 cache and to induce transmission of only the modified copy of the data in an L1 cache when both the L1 cache and an L2 cache contain a modified copy of the data.

SUMMARY OF THE INVENTION

The need in the art is addressed by the present invention. The present invention provides a method and apparatus for providing memory coherency among an L1 and L2 cache memory devices and a main memory device. In an embodiment of the invention, a memory controller generates an address snoop for locating modified copies of a data residing in the main memory. As a result of the snoop, the memory controller is notified as to whether a modified copy of the data is in the cache memory devices. When both cache memory devices have a modified copy of the data, the modified copy in the L2 cache will not be allowed to be transferred since modified copies of data in the L1 cache memory are always considered to be the most recent copies. Thus in this case, if the processor is too busy to check the L1 cache memory to ascertain whether it contains a modified copy of the data, the memory controller will continually snoop the address until the modified copy of the data is transferred. When only the L2 cache memory device has a modified copy of the data, the copy will be transferred to the memory controller and since the memory controller will have already known that the L1 cache memory device does not contain a modified copy of the data, it will not snoop the address a second time. Hence, only one copy of the modified data will be transferred to the memory controller when both cache memory devices contain modified copies of the data and only one snoop is generated by the memory controller when only one modified copy of the data exists and it resides in the L2 cache memory device.

DESCRIPTION OF THE INVENTION

Figure 1:
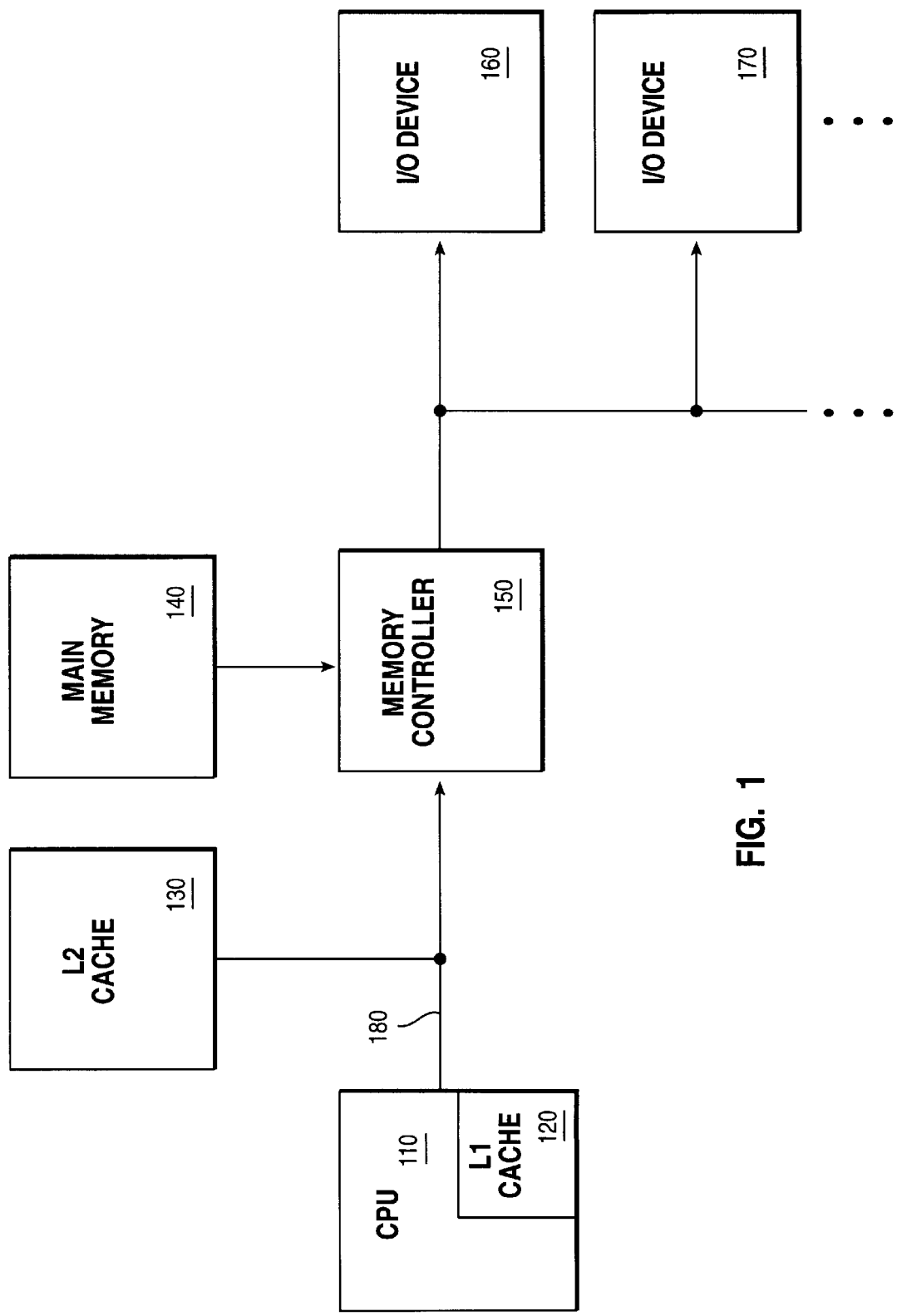
FIG. 1 is a block diagram of a computer system employed in a preferred embodiment of the invention.

FIG. 1 is a block diagram of a computer system 100 employed in a preferred embodiment of the invention. Such computer may take the form of a workstation such as the RS/6000 systems marketed by the IBM Corporation, although the invention is not intended to be so limited and is equally applicable to essentially any computer system.

Still referring to FIG. 1, the computer includes central processing unit (CPU) 110 incorporating an L1 cache 120. The processor 110 is coupled to a memory controller 150 and an L2 cache 130 via bus 180. The memory controller is itself coupled to a main memory 140 and input/output (I/O) devices 160 and 170. The input devices may include a keyboard, mouse, tablet, or other types of input devices and output devices may include a printer, text monitor, plotter, or other well known output devices.

Ordinarily, data is stored in the main memory 140. When the processor 110 needs to process data, the data is requested from the main memory 140 and provided to the processor 110. At the same time, a copy of the data is also transferred to the L2 cache 130 as well as the L1 cache 120 for further use by the processor 110. As stated before, the data in both caches will be discarded if a certain amount of time has elapsed before it is used by the processor. This time is shorter for the L1 cache than it is for the L2 cache. If while processing the data an updated version is produced, the updated version will be stored in the L1 cache replacing the old copy of the data. Before the updated version of the data is discarded from the L1 cache 120 due to non-use, it will be written in the L2 cache 130. If the processor uses the modified data that now only resides in the L2 cache 130, a copy of the data will be transferred to the L1 cache. This copy may again be modified by the processor 110. Thus, provided that the data is again modified by the processor, the L1 cache will contain the most recent copy of the data. Hence, both the L1 and the L2 caches will have a modified, yet different, copy of the original data residing in the main memory. Suppose, then, one of the I/O devices needs this particular data, before providing the data to the I/O device, the memory controller will snoop the address of the data to ascertain that the copy that will be provided to the I/O device is the latest copy. If during the snoop the processor was too busy to check the L1 cache memory to determine whether it contains a modified copy of the data, only the L2 cache will check the address and provide the data to the memory controller. Since the memory controller is not sure that the L1 cache does not also contain a modified copy of the data, it has to snoop the address again.

The memory controller 150 snoops an address by asserting transfer start (TS) while driving the address onto the local bus 180. The snoop protocol requires that each device, in this case the processor 110 and the L2 cache, on the local bus 180 check the address presented to see if the data it references is cached. If the data is cached and has been modified, the processor and/or the L2 cache is required to assert address retry (ARTRY) until one clock period after detecting an address acknowledge (AACK) signal from the memory controller 150. In the second clock period after AACK is asserted, the processor and/or the L2 cache is required to assert its respective bus request (CPU_BR and/or L2_BR). If the data cached in the L2 cache memory device has not been modified, then the L2 cache will not assert L2_BR. Similarly, if the data cached in the L1 cache memory device has not been modified, the processor will not assert CPU_BR.

Figure 2:
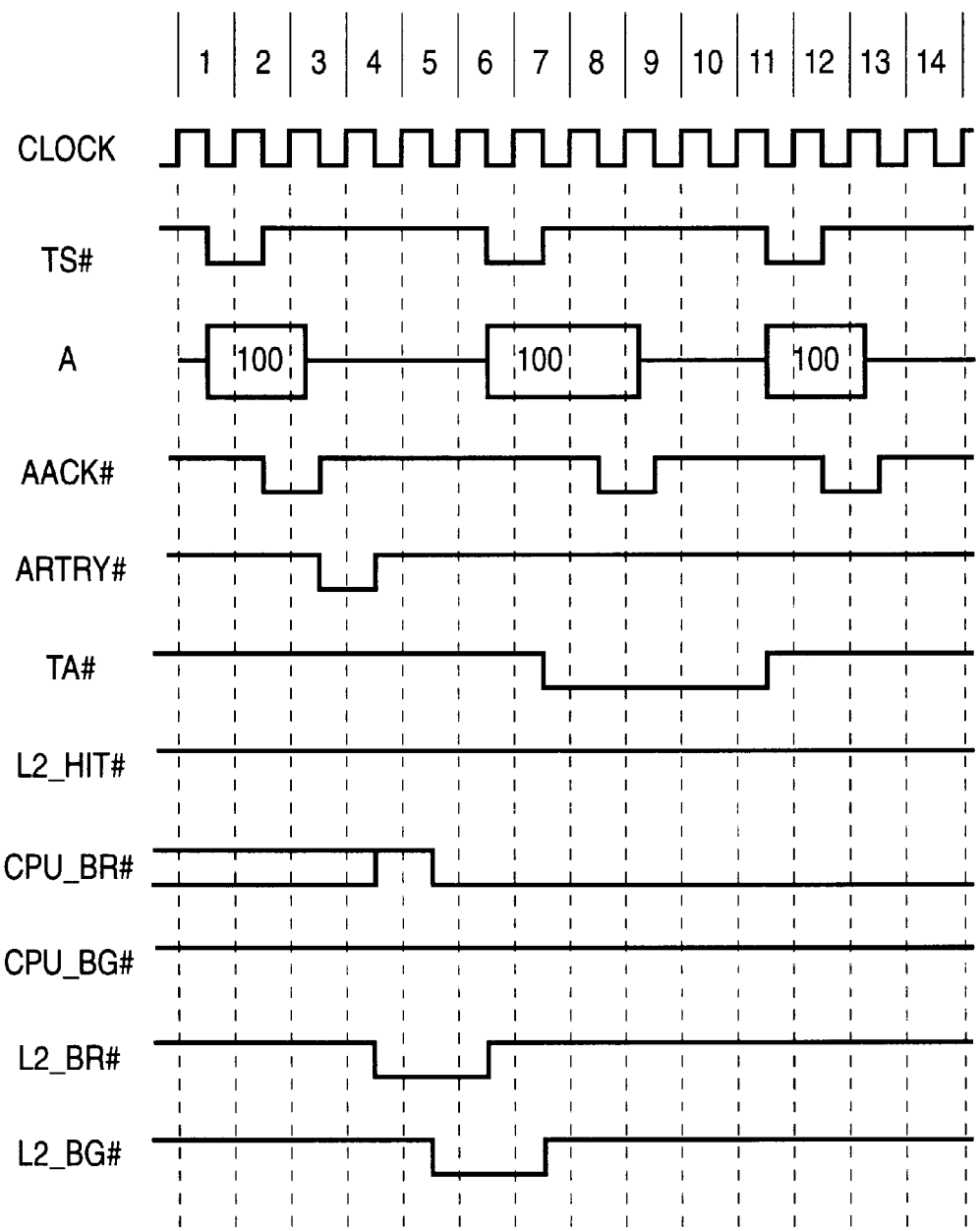
FIG. 2 is a detailed diagram depicting the various signals and their states during a memory controller address snoop employed in the prior art.

FIG. 2 is a detailed diagram depicting the various signals and their states during a memory controller address snoop employed in the prior art. Suppose the L2 cache has a modified cached data and the L1 cache does not, the following will occur. The memory controller snoops address 100 in clock period 1 by asserting the TS signal and loading the address (A) onto the bus. The memory controller asserts the AACK signal in clock period 2 to indicate the end of the address phase. In clock period 3, the L2 cache will indicate that it contains a modified line at that address by asserting ARTRY in clock period 3. Note that the processor will not drive the ARTRY signal since it does not contain a modified line at that address. The L2 cache will assert the bus by asserting the L2_BR signal in clock period 4. The bus is granted to the L2 cache in clock period 5 and the L2 cache asserts TS in clock period 6. The memory controller drives the TA signal during clock periods 7–10 to receive the data. In clock period 11, the memory controller will snoop the address again since it is not certain whether the processor did or did not assert the ARTRY signal and that its snoop port was busy. As ARTRY is not asserted in clock period 13, the memory controller knows that no further snoops are required.

In the case where both the L1 cache and L2 cache have a modified cached data and the processor was too busy to actually perform the cache check, the following will occur. In clock period 1, the memory controller snoops address 100. In clock period 2, the memory controller indicates the end of the address by asserting the AACK signal. In clock period 3, both the processor and the L2 cache will assert address retry (ARTRY). In clock period 4, the L2 cache will request the bus by asserting the L2_BR signal. In clock period 5, the bus will be granted to the L2 cache. The L2 cache will indicate its readiness to write back its modified cached data by asserting TS and putting the address 100 on the bus in clock period 6. In clock periods 7–10, the memory controller will drive the transfer acknowledge (TA) signal to receive the data. In clock period 11, the memory controller will snoop the address again because it does not know whether the ARTRY signal was asserted by only the L2 cache memory device. The signals' activities beginning with clock period 12 to the end of the transaction are not shown; however, the following will occur. In clock period 12, the memory controller will drive the AACK signal to indicate the end of the address phase. In clock period 13, the processor will send the ARTRY signal, request the bus by asserting the CPU_BR signal in clock period 14. The memory controller will grant the bus to the processor by driving the CPU_BG signal in clock period 15 and the data will be transferred once the TA signal is asserted by the memory controller in clock periods 17–20.

Thus, when the processor is too busy to check the L1 cache during a memory controller address snoop and both the L1 and L2 caches contain a modified cache line at that address at least two snoops and two cache write backs are effectuated. When the modified data resides only in the L2 cache at least two snoops will be effectuated. Using the present invention, however, only one cache write back will be effectuated when both L1 and L2 caches have a modified line at the address snooped and the processor is too busy to check the L1 cache during the snoop and only one snoop will be effectuated when only the L2 cache has a modified data line.

The implementation of the invention uses an L2_hit signal to indicate that the L2 cache has a modified line at the address snooped and the ARTRY signal to denote a modified data in the L1 cache. Consequently, when both the L2_hit signal and the ARTRY signal are asserted it is an indication that both the L1 cache and the L2 cache contain modified data at the address snooped. If the CPU_BR signal is not asserted in the next clock period, the memory controller is informed that the processor is too busy to check its cache and thus will not be able to provide the modified copy of the data. However, since modified copies of data in the L1 cache are considered the most recent copies, the L2_cache need not provide its modified data. Hence, although the memory controller has to snoop the address again for the provision of the modified data in the L1 cache, only one cache write back is effectuated.

When the L2_hit signal is asserted and the ARTRY signal is not, it indicates that only the L2 cache contains modified, data at the snooped address. Hence after receiving the modified data from the L2 cache, the memory controller need not snoop the address a second time.

Figure 3:
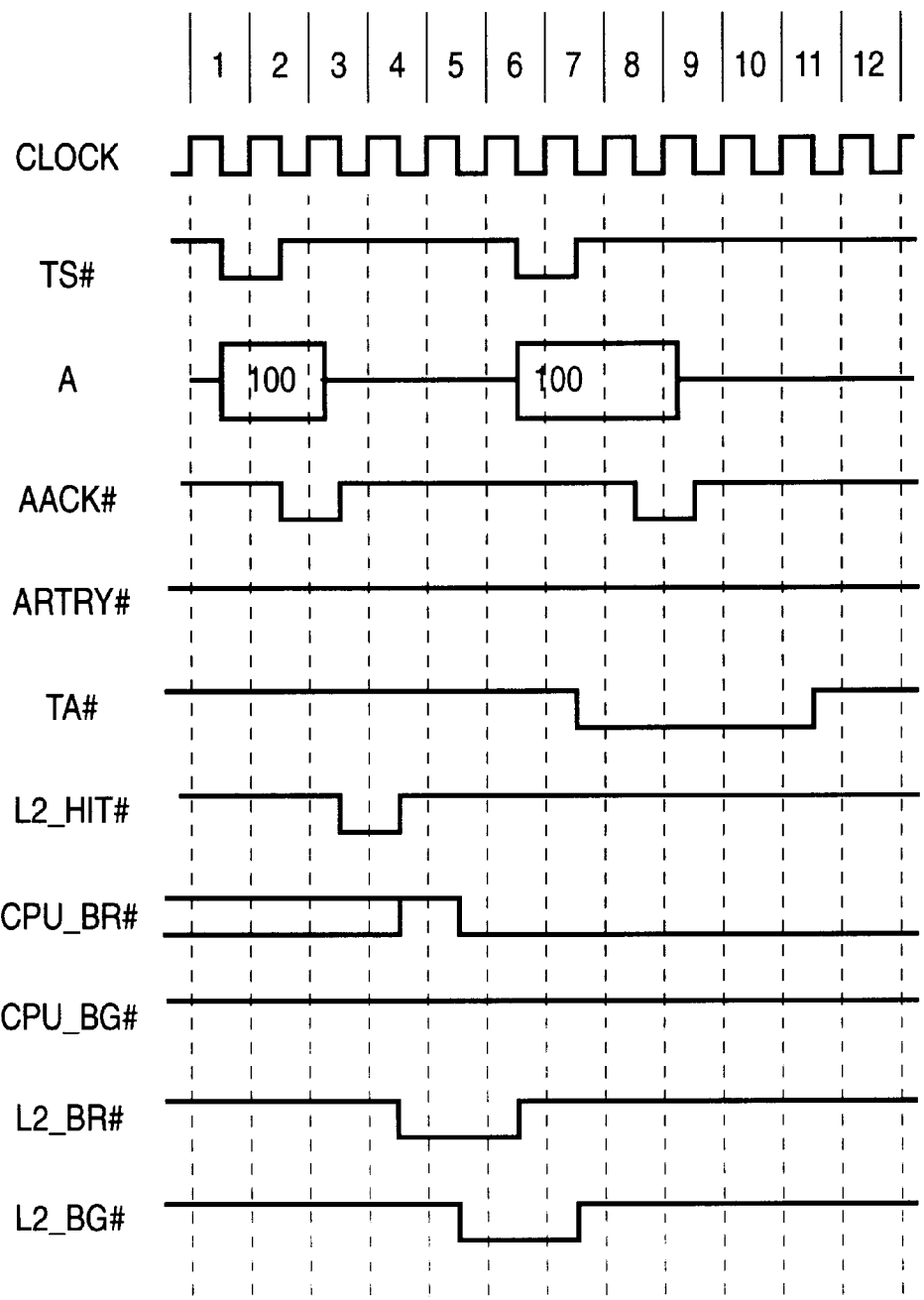
FIG. 3 is a detailed diagram depicting the various signals and their states during a memory controller address snoop employed by the present invention.

FIG. 3 is a detailed diagram depicting the various signals and their states during a memory controller address snoop employed by the present invention. When the L2 cache has a modified data at the address snooped and the L1 cache does not, the following will occur. In clock period 1, the memory controller snoops address 100. The L2 cache checks to determine whether there is a modified copy of the data at address 100 in clock period 2. In clock period 3, the L2 cache asserts the L2_hit indicating that there is a modified copy of the data. Here, ARTRY will not be asserted since L1 cache does not contain a modified copy of the data at that address. In clock period 4, the L2 cache asserts L2_BR to request the bus in order to provide the modified copy. The memory controller grants the bus to the L2 cache in clock period 5 and the L2 cache asserts TS in clock period 6. The memory controller drives TA in clock period 7–10 to accept the data from the L2 cache. As the memory controller is aware that the L1 cache does not contain modified data at the snooped address it will not snoop the address a second time.

Accordingly, the invention speeds up the snooping process by at least three clock periods when only the L2 cache has a modified copy of the data by eliminating the need for additional snoops to ascertain whether a modified copy of the data is also contained in the L1 cache. Furthermore, as the invention only allows one copy of the data to be transferred when both the L1 and the L2 caches have a modified copy of the data and the processor is too busy to check its cache during the snoop, more time may be saved. Moreover, the invention may save even more time for systems in which the memory controller requires an additional clock to drive the address to a valid level before asserting TS.

Although the present invention has been fully described above with reference to specific embodiments, other alternative embodiments will be apparent to those of ordinary skill in the art. For example, the invention may be used in a multi-processor system without deviating from the present description. Therefore, the above description should not be taken as limiting the scope of the present invention defined by the appended claims.

What is claimed is:

1. A memory controller for providing memory coherency among a plurality of memory devices comprising:

means for generating a first address snoop;

means, responsive to said first address snoop, for receiving an indication as to whether one or more of said memory devices contain a modified copy of said data;

means, if more than one of said memory devices contain a modified copy of said data, for determining whether the memory device with the most recent modified copy of said data can presently transmit said most recent copy; and means, if the memory device with the most recent modified copy of said data cannot presently transmit said most recent copy, for precluding transmission of any other modified copy of said data by any one of the other memory devices.

2. The controller of claim 1 further comprising means, if transmission of a modified copy of said data contained in any of the other memory devices is precluded, for generating at least a second address snoop to induce transmission of the most recent modified copy of said data.

3. The method of claim 1 further comprising the step of generating, if transmission of a modified copy of said data contained in any of the other memory devices is precluded, at least a second address snoop to induce transmission of the most recent modified copy of said data.

4. A method of providing memory coherency among a plurality of memory devices comprising the steps of:

generating a first address snoop;

receiving, in response to said first address snoop, an indication as to whether one or more of said memory devices contain a modified copy of said data;

determining, if more than one of said memory devices contain a modified copy of said data, whether the memory device with the most recent modified copy of said data can presently transmit said most recent copy; and precluding, if the memory device with the most recent modified copy of said data cannot presently transmit said most recent copy, transmission of any other modified copy of said data by any one of the other memory devices.

* * * * *